United States Patent
Hazelton

(10) Patent No.: US 6,570,273 B2
(45) Date of Patent: May 27, 2003

(54) ELECTRIC LINEAR MOTOR

(75) Inventor: Andrew J. Hazelton, San Carlos, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/755,035

(22) Filed: Jan. 8, 2001

(65) Prior Publication Data

US 2002/0089237 A1 Jul. 11, 2002

(51) Int. Cl.[7] ............................................. H02K 41/00
(52) U.S. Cl. ................................................... 310/12
(58) Field of Search ............................ 310/12, 13, 14, 310/42; 318/135; 29/596

(56) References Cited

U.S. PATENT DOCUMENTS

| | | | |
|---|---|---|---|
| 4,151,447 A | 4/1979 | von der Heide et al. ... | 318/135 |
| 4,224,461 A * | 9/1980 | Snyder, Jr. et al. ......... | 136/233 |
| 4,467,229 A * | 8/1984 | Ogita ........................ | 310/60 A |
| 4,641,065 A | 2/1987 | Shibuki et al. ............. | 318/135 |
| 4,644,234 A * | 2/1987 | Nola ........................... | 318/254 |
| 4,758,750 A | 7/1988 | Itagaki et al. ................ | 310/13 |
| 4,767,954 A | 8/1988 | Phillips ....................... | 310/12 |
| 4,857,782 A * | 8/1989 | Tokio et al. .................. | 310/12 |
| 5,072,144 A | 12/1991 | Saito et al. .................. | 310/12 |
| RE34,674 E | 7/1994 | Beakley et al. .............. | 310/12 |
| 5,536,983 A | 7/1996 | Araki et al. .................. | 310/12 |
| 5,555,928 A * | 9/1996 | Inaba et al. .................. | 165/47 |
| 5,703,420 A | 12/1997 | Kamata et al. ............... | 310/54 |
| 5,744,896 A * | 4/1998 | Kessinger, Jr. et al. ..... | 310/268 |
| 5,808,381 A | 9/1998 | Aoyama et al. ............. | 310/12 |
| 5,998,889 A * | 12/1999 | Novak .......................... | 310/12 |
| 6,008,553 A * | 12/1999 | Gonzalez ..................... | 310/12 |
| 6,127,749 A * | 10/2000 | Sogard ......................... | 310/12 |
| 6,265,793 B1 * | 7/2001 | Korenaga ..................... | 310/12 |
| 6,313,550 B1 * | 11/2001 | Binnard et al. ............... | 310/12 |

* cited by examiner

Primary Examiner—Nestor Ramirez
Assistant Examiner—Judson H. Jones
(74) Attorney, Agent, or Firm—Finnegan, Henderson, Farabow, Garrett, & Dunner, L.L.P.

(57) ABSTRACT

A low mass electric linear motor having a magnet assembly with a plurality of magnets fixed to a base member. Each magnet has two opposing magnetic surfaces with opposite magnetic poles. The plurality of magnets are attached to the base member such that all of the opposing magnetic surfaces are aligned and are alternating in magnetic polarity along the base member. A coil assembly is disposed around at least a portion of the magnet assembly. The coil assembly has two walls joined to a header. Each of the walls has a plurality of juxtaposed flat coils and further has a plurality of bent coils. The bent coils overlap with the flat coils such that a vertical side of each bent coil is positioned within an aperture of a flat coil. In another aspect of the invention, each wall of the coil assembly is enclosed in a cooling canister. Chilled coolant is pumped through the canister thereby removing heat generated by the coil assembly during operation.

39 Claims, 14 Drawing Sheets

ELECTRIC LINEAR MOTOR

TECHNICAL FIELD

The invention is directed to electric motors and more specifically to magnet and coil assemblies used in electric linear motors.

BACKGROUND ART

Electric linear motors are used in various types of electrical equipment. For example, multi-axis positioning stages used in the manufacture of integrated circuits utilize electric linear motors. Conventional linear electric motors generally have a magnet track with pairs of opposing magnets facing each other. Within spaces between the pairs of opposing magnets, an armature moves. The armature has coils of a conductor which are connected to an electrical current. When the electrical current is turned on, the current interacts with the magnetic fields of the magnet pairs to cause a force on the armature. When the armature is attached to a wafer stage, the wafer stage can be made to move in concert with the armature.

For further background information, the reader is directed to the following standard textbooks all of which are incorporated by reference herein in their entirety: Permanent-Magnet DC Linear Motors, A. Basak, Clarendon Press, 1996; Fundamentals of Physics, Second Edition, Extended Version, Revised Printing, David Halliday and Robert Resnick, John Wiley & Sons, 1986; Brushless Permanent-Magnet Motor Design, D. C. Hanselman, McGraw-Hill, 1994; Design of Brushless Permanent-Magnet Motors, J. R. Hendershot, Jr. and T. J. E. Miller, Magna Physics Publishing and Clarendon Press, 1994.

Examples of conventional electric motors having a magnet track with pairs of opposing magnets are shown in U.S. Pat. Nos. 4,151,447; 4,758,750; 4,767,954; and 5,808,381. In U.S. Pat. No. 4,151,447 to von der Heide et al., a stator is disclosed having a pair of ferromagnetic parallel bars, each with a row of magnets extending lengthwise. An armature having a plurality of coils is mounted between the rows of magnets. The armature can travel in the direction of the rows of magnets. In U.S. Pat. No. 4,758,750 to Itagaki et al., another linear motor of the moving-coil type is disclosed. The stationary part in Itagaki et al. includes two opposed magnet paths, each having a plurality of magnets linearly arranged. U.S. Pat. No. 4,767,954 to Phillips also teaches an electric motor having a single coil array with magnets on both sides of the coils. Accordingly, each of the above inventions requires two sets of magnets to move the armature. Consequently, the mass of these linear motors is relatively high.

Another example of a magnet track comprising two rows of magnets is disclosed in U.S. Ser. No. 09/054,766 to Nikon Research Corporation of America which is hereby incorporated by reference. In U.S. Ser. No. 09/054,766, an armature having a plurality of similarly-shaped and overlapping coils is featured. By overlapping a number of coils, the linear motor packs more coils into the limited space between the two rows of magnets. The linear motor has increased efficiency due to the increase in coil density. Its mass, however, remains relatively high because the design requires two rows of magnets. What is needed is a linear motor having less mass.

Various electric linear motors having single magnet arrays are also known. For example, U.S. Reissue Pat. No. 34,674 to Beakley et al. shows an electric motor with a single magnet array. In Beakley et al., coils are aligned along each side of a single magnet array. The design in Beakley et al. further requires a magnetic circuit completion means. Beakley et al. provides that the magnetic circuit completion means is an iron plate positioned along the outside of each coil array. This iron plate increases the mass of the magnet assembly and does not provide a low mass electric linear motor.

U.S. Pat. No. 4,641,065 to Shibuki et al. also discloses a single magnet array type design. In Shibuki et al., a pair of coils are movably disposed along permanent magnets.

U.S. Pat. No. 5,072,144 to Saito et al. shows a stator means having a single permanent magnet array. Moving means are mounted to the stator means series of cores wherein each of the moving means is U-shaped in cross section. Each core further has two leg portions wound with coils to provide electromagnetic force. While the motor contains only a single linear array of magnets, the motor's mass is increased due to the mass of the cores.

SUMMARY OF THE INVENTION

The invention features a low mass electric linear motor having a magnet assembly with a plurality of magnets fixed to a base member. Each magnet has two opposing magnetic surfaces with opposite magnetic poles. The plurality of magnets are attached to the base member such that the opposing magnetic surfaces are aligned and are alternating in magnetic polarity along the base member. A coil assembly is disposed around at least a portion of the magnet assembly. The coil assembly has two walls joined to a header. Each of the walls has a plurality of juxtaposed flat coils and a plurality of bent coils. The bent coils overlap with the flat coils such that a vertical side of each bent coil is positioned within an aperture of a flat coil. In another aspect of the invention, each wall of the coil assembly is enclosed in a cooling canister. Chilled coolant is pumped through the canister thereby removing heat generated by the coil assembly during operation.

An advantage of the present invention is that the magnetic assembly has a relatively low mass. The mass of the magnetic assembly is relatively low since only a single row or array of magnets is used, rather than a dual-magnet track. This is an advantage in, for example, smoothly accelerating a wafer stage of a multi-axis positioning table used in the manufacture of integrated circuits.

Another advantage of the present invention stems from interlocking the coils within the coil assembly. Interlocking the coils increases coil density and since the coils provide electromagnetic force when conducting electricity, an increase in coil density increases the amount of electromagnetic force generated by the coil assembly. Thus, a higher driving force may be achieved using the same size motor.

These and other advantages and features of the invention will become readily apparent to those skilled in the art upon a study of the following drawings and a reading of the description of the invention below.

While the present invention shall now be described with reference to the embodiments shown in the accompanying drawings, it should be appreciated that the present invention is not limited to the embodiments shown but rather includes all possible modifications, alterations, and equivalent arrangements within the scope of the appended claims.

DESCRIPTION OF THE INVENTION

Figure 1:
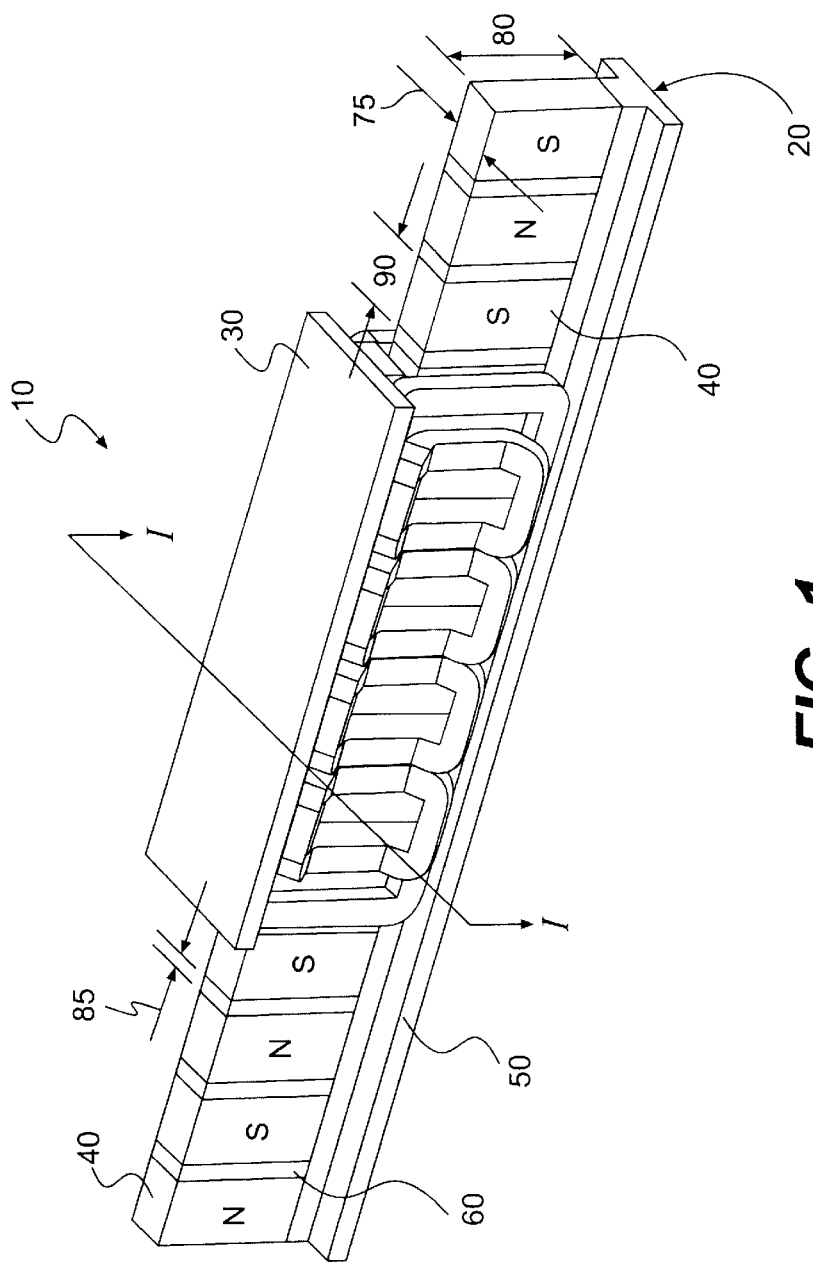
FIG. 1 is a perspective view of an electric linear motor in accordance with the present invention.

FIG. 1 shows an electric linear motor 10 in accordance with the present invention. In FIG. 1, the electric linear motor 10 is shown having a magnet assembly 20 and a coil assembly 30 slideably disposed around a portion of the magnet assembly 20. The interface between the magnet assembly 20 and the coil assembly 30 is preferably frictionless. A preferred interface is an air bearing although other low friction interfaces may be employed.

The magnet assembly 20 has a plurality of magnets 40 attached to a base member 50. The magnets 40 are preferably made of a high energy permanent magnet material such as Neodymium Iron Boron (NdFeB) and are affixed to base member 50 using an adhesive, screws, or other suitable fastener. The base member is preferably made of a non-magnetic material such as ceramic, aluminum, or 300 series stainless steel.

Each magnet of magnet assembly 20 has two opposing surfaces containing opposite magnetic poles (N and S). The opposing surfaces of each of the magnets 40 are aligned to form a single row of magnets 40. The magnets 40 are further arranged such that the magnetic pole of each magnet alternates along the row. In addition, spacers 60 may be interposed between the magnets 40. The spacers 60 are preferably held in place using an adhesive or fasteners such as screws.

The spacers 60 are preferably made of a non-magnetic material such as a ceramic, aluminum, 300 series stainless steel, or plastic. A preferable thickness 75 for the spacers 60, as well as the magnets 40, is from about 10 to 50 mm. A preferable height 80 for the spacers 60, as well as the magnets 40, is from about 50 to 150 mm. A preferable width 85 for the spacers 60 is from about 1 to 20 mm and a preferable width 90 of magnets 40 is from about 20 to 70 mm.

Figure 2:
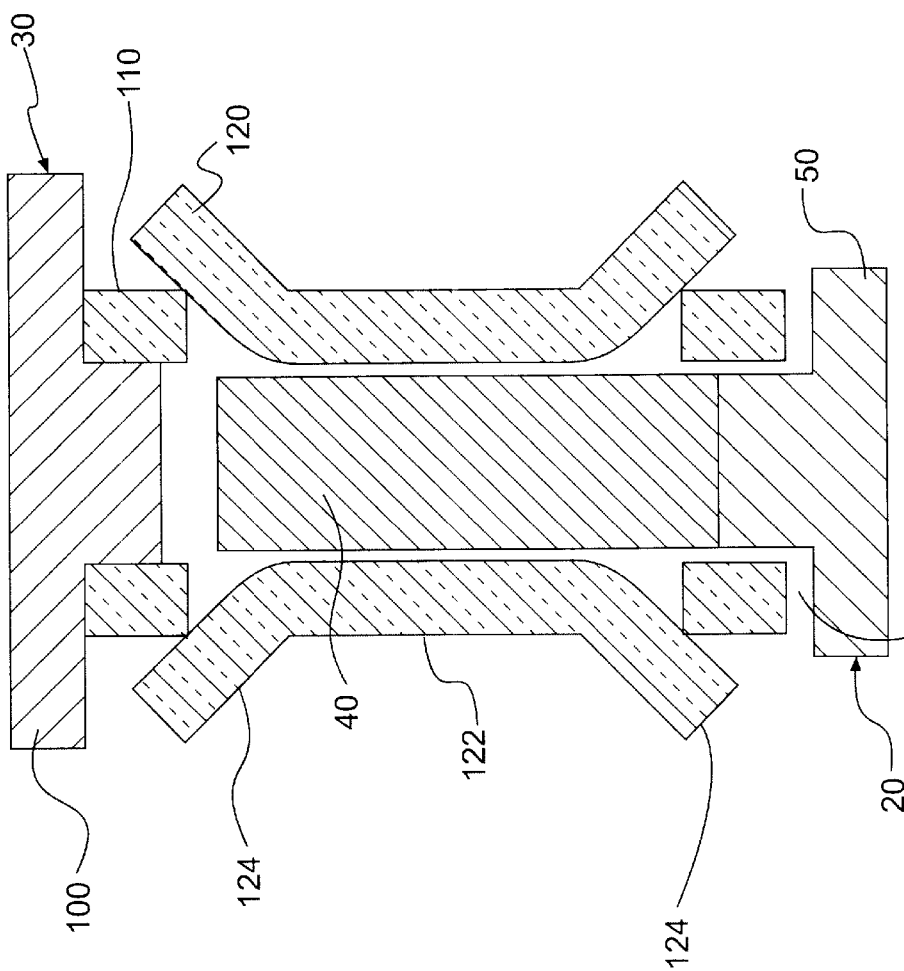
FIG. 2 is a sectional view taken along section line I—I of FIG. 1.
Figure 3:
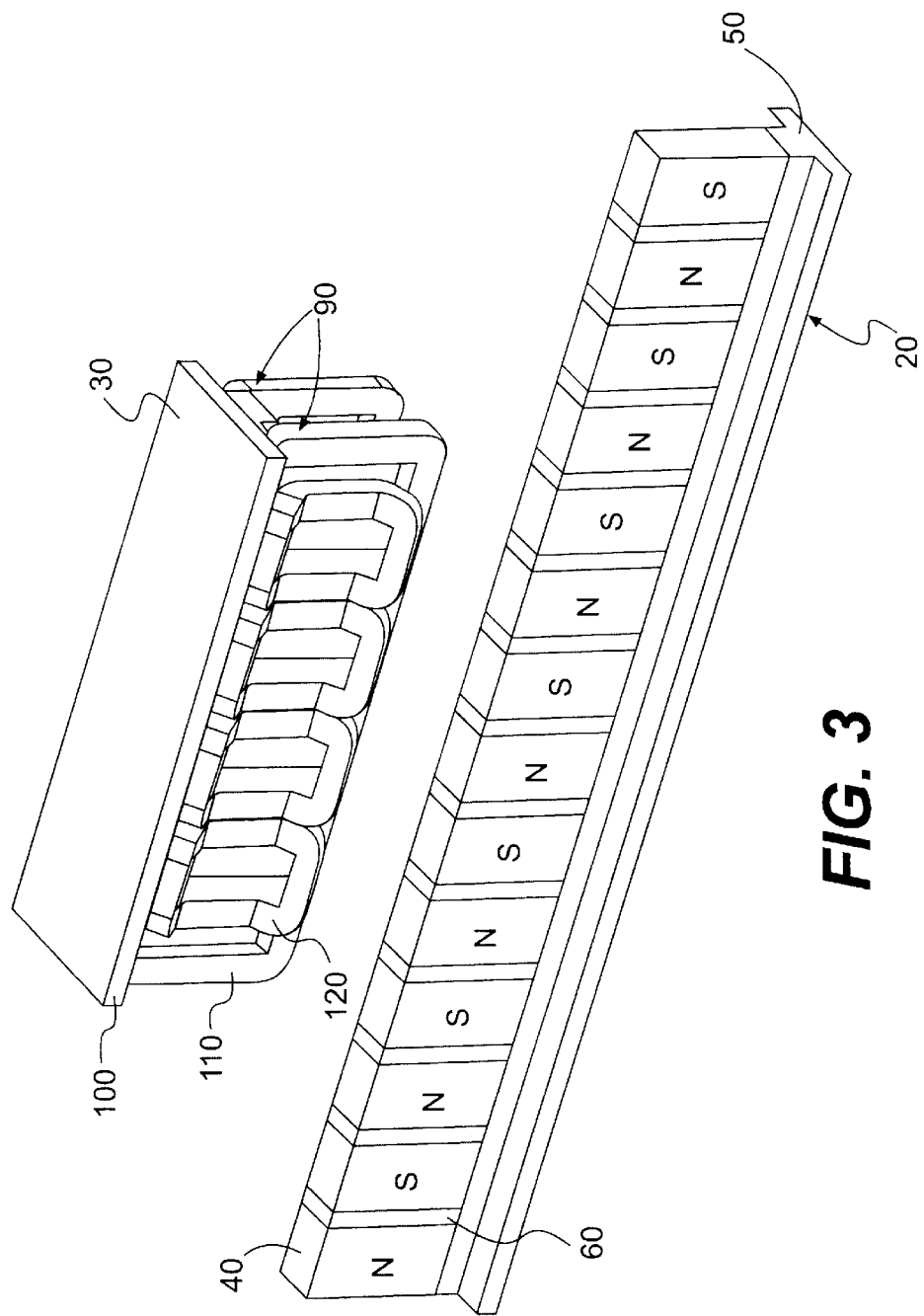
FIG. 3 is a partially exploded view of the embodiment shown in FIG. 1.

A cross sectional view, taken on line I—I, of the electric linear motor 10 is shown in FIG. 2. As described above, linear motor 10 has at least a portion of the magnet assembly 20 disposed within the coil assembly 30. The coil assembly 30 comprises two walls 90 (shown in FIG. 3) attached to a header 100. Each of the walls 90 comprises a plurality of flat coils 110 and bent coils 120. The flat coils 110 are juxtaposed, (i.e., put side by side) and attached to the header 100. One method of attaching the flat coils 110 to the header is with an adhesive such as epoxy. Alternatively, flat coils may be attached to the header using fasteners including screws, brackets, or ties, for example.

Interlocked with the flat coils 110 are a number of bent coils 120. As shown in FIG. 2, each of the bent coils 120 has a flat portion 122 and two outward bends 124. The bends 124 of each of the bent coils 120 protrude away from, or outward, relative to the magnets 40. The outward bends 124 are advantageous because the flat portion 122 of the bent coils 120 can be aligned with the flat coils 110 to form a substantially flat and dense coil plane.

Figure 4:
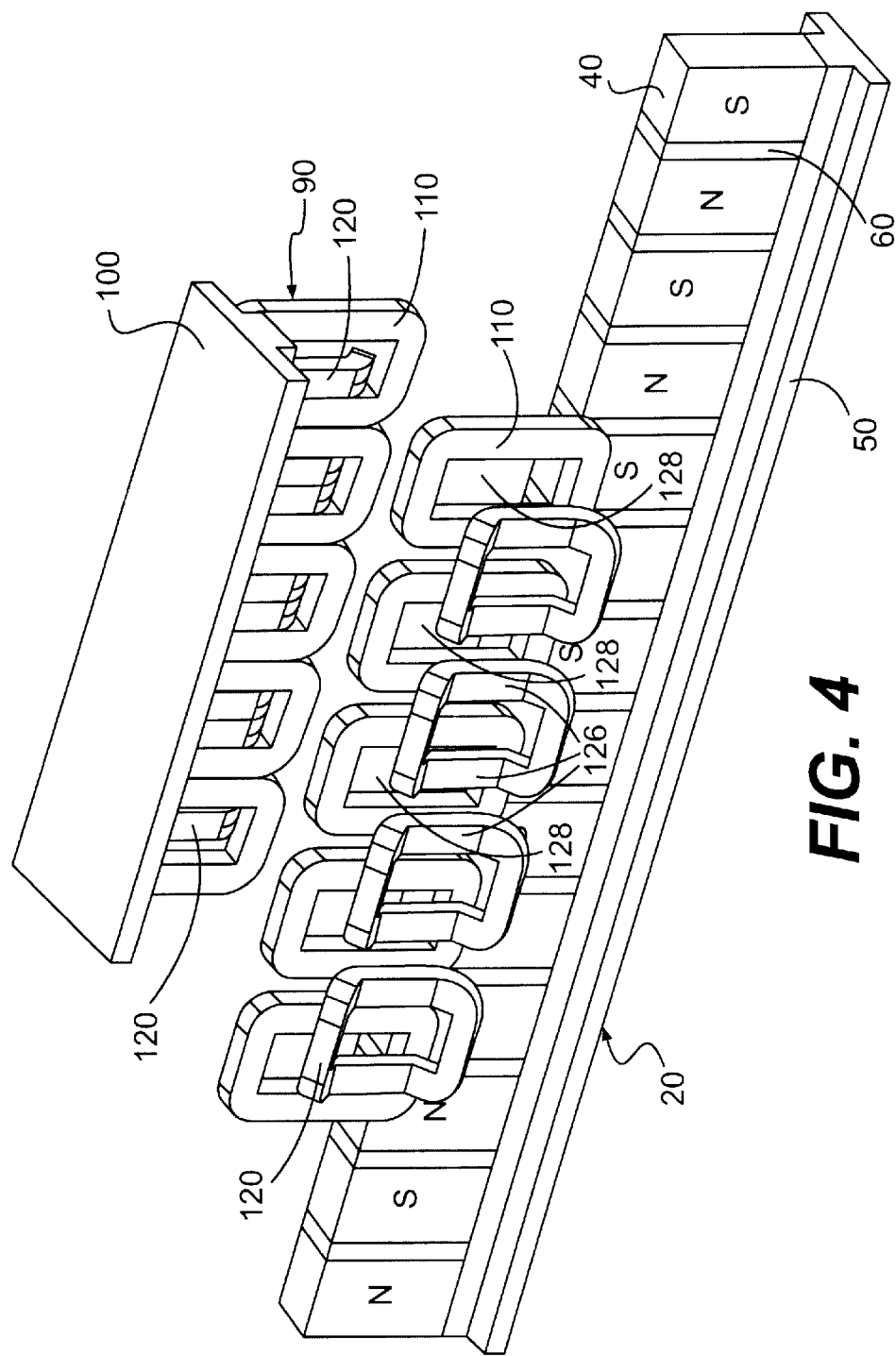
FIG. 4 is another partially exploded view of the embodiment shown in FIG. 1.

As shown in FIG. 4, the flat portion of each bent coil 120 includes a pair of vertical sides 126. The bent coils 120 are aligned with the flat coils 110 by positioning a vertical side 126 of each bent coil 120 in an aperture 128 of an adjacent flat coil 110. Accordingly, two vertical sides 126 (one vertical side of each of the adjacent bent coils 120) are positioned in each of the apertures 128 of the flat coils 110. The sides 126, as shown in FIG. 4, may be vertical but need not be vertical. Once positioned, the bent coils 120 may be held in place using an epoxy, ties, fasteners, or the like.

Steps for manufacturing the coil assembly or armature in accordance with the present invention include: forming a number of individual regular coils; insulating the coils; pressing the coils to be shaped; interlocking the shaped coils with the non-pressed coils; attaching the interlocked coils to a header; electrically connecting the coils to a terminal; and enclosing the interlocked coils to complete the making of the armature.

As a first step, a conductive wire is wound into individual regular coils. The coils may also be insulated from one another by, for example, attaching insulating strips. Further, each coil may be pressed before being assembled with the other coils. Each individual coil may be pressed while it is on a mandrel during or after the winding step, or they may be pressed in molds after being wound.

After being pressed, the pressed or shaped coils may be aligned and interlocked with the flat coils in an overlapping fashion as described above with reference to FIGS. 1–4. Once in a desired position, the coils are impregnated with an adhesive substance such as epoxy. The adhesive substance is then cured, forming a "wall" of interlocking and overlapping coils. For some adhesive substances, the cure time may be quite short but lengthy for other adhesive substances.

Finally, the wall of interlocking coils may be attached to the header by placing a portion of the wall of interlocking coils in a channel in the header. Epoxy or another adhesive substance is poured or applied to the channel in the header. While the adhesive substance and the coils are in the channel, the adhesive substance, such as epoxy, is allowed to cure. Once the epoxy or adhesive substance is cured and the coils are electrically connected to the terminal, the coils may be enclosed, completing manufacture of the coil assembly or armature.

Figure 5:
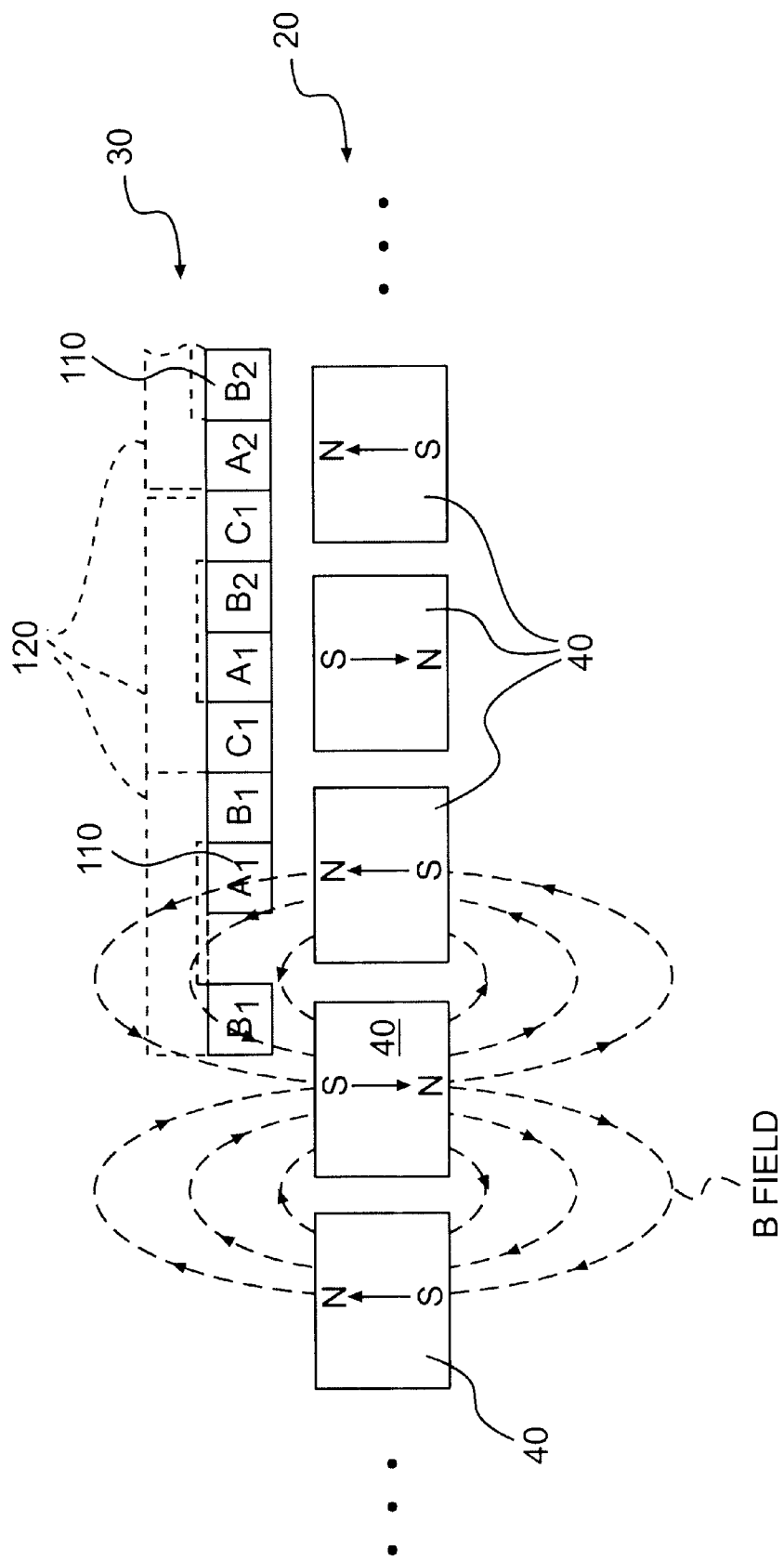
FIG. 5 is a top schematic view of a portion of an electric linear motor of the present invention illustrating the magnetic field lines of the magnet array.

Clearly, many variations of the method of making the coil assembly are possible. For example, many of the above described steps may be permuted. Additionally, not all of the steps are required to make an armature in accordance with the invention. Referring to FIG. 5, magnetic field lines B are shown moving into and out of magnets 40. The magnetic field lines B interact with current supplied to the coils or windings to produce a force. The direction of the force depends on the direction of the current, and by controlling the current as a function of coil position, smooth motion can be achieved.

Methods for controlling the current in an electric linear motor are generally known to one skilled in the art. In a multiphase motor, for example, the armature or coil assembly has various windings grouped into phases. The phase groups are selectively pulsed with electric current to create a more efficient motor. As the armature moves within the magnet track 20 as a first group of coils is pulsed, the first group moves out of its optimal position along a magnet 40 of magnet track 20. Then, it becomes more efficient to pulse a second group of windings. More phase groups are theoretically more efficient since a more even application of force and utilization of power input is maintained. However, each additional phase group complicates a timing of the pulses to the various phase groups. Presently, three-phase motors and armatures have gained favor in balancing these considerations.

In FIG. 5, an electric motor having three phases of conductor windings is shown. The blocks (A1, B1, C1) in FIG. 5 represent cross-sections of regular conductor windings of the flat coils 110 and bent coils 120 as they would be arranged in an armature or coil assembly 30. Blocks with the same letter are grouped into the same phase, and successive blocks with the same phase have consecutive numbers. For example, the two A1 blocks are part of one regular winding grouped in the A-phase category. The blocks A2 represent cross-sections belonging to the next regular conductor winding with the same phase. Notice that the regular windings having the same phase are separated from each other by other windings not having the same phase such as the B and C windings. Accordingly, the three different phase groups may be selectively pulsed to create efficient movement of the coil assembly 30 along the magnet assembly 20.

An advantage of the present invention is increased motor efficiency. That is, for a given size motor, more electromagnetic force (driving force) can be created by supplying a current to the coils when the coils are densely interlocked. This is because the amount of electromagnetic force is proportional to the density of coils.

Another advantage of the present invention is a reduction in mass. Less mass in an electric motor is an advantage in a number of applications such as, for example, lithography applications where a wafer stage is moved at a specified acceleration by a multi-stage positioning table relative to a light source. To move the wafer stage at a specified acceleration, a force is required which is affected by the mass to be moved (see e.g., Newton's Second Law). Reducing the mass of the components to be moved, therefore, allows the motor to achieve a specified acceleration using less force and less energy.

Typically, the stages are stacked and driven by independent electric motors. When the lower stage is moved, the mass of the additional upper components must also be moved. A reduction in the mass of the motor's components, therefore, generally reduces the amount of mass to be moved.

In applications requiring only a single-stage positioning table or for use in moving the top most stage of a multi-stage positioning table, however, a reduction in the mass of the magnet track alone will not necessarily reduce the mass to be moved at the stage. This is because the magnet track is typically attached to a supporting surface that remains relatively fixed. However, the coil design of the present invention provides reduced mass benefits enjoyed even in these examples.

Not only is the mass of the magnet assembly 20 reduced since it contains only a single row of magnets 40, the electric motor of the present invention also provides a reduced mass coil assembly 30. Specifically, coil assembly 30 is relatively lower in mass because its coils are not disposed about a metal core. The advantages resulting from a coreless coil assembly 30 apply not only to multistage positioning tables as described above, but also to single-stage positioning tables and top-stage applications. This is true because the coreless coil assembly itself is typically moved with the stage. Since the coreless coil assembly is typically moved, it is advantageous to both single and multistage positioning tables. Thus, in a moving magnet arrangement for these applications, the moving mass is reduced when compared with the typical dual-magnet arrangement; and in a moving coil arrangement, the moving mass is also reduced by the provision of the coreless coil arrangement.

A coreless design is also beneficial because it substantially reduces the problems associated with "cogging" and eddy currents. "Cogging" occurs when a magnetic material (such as iron) forms part of the armature in an electric linear motor. The magnetic material may be used as a core for supporting or aligning electrically conducting coils. Although the iron core enhances the magnetic fields created by a fixed magnet track, it also has a bias or tendency to align in accordance with the polarity of the magnets on the magnet track. This bias occurs even if such alignment is not intended by the operator. Consequently, the motor is susceptible to non-smooth, jerked movements.

Eddy currents can also be substantially reduced using a coreless coil assembly. Eddy currents may be problematic in electrically conducting cores such as aluminum or certain steels. The eddy currents are created when the cores are moved through a magnetic field. The induced eddy currents create forces which oppose the direction of movement of the coil assembly. Thus, the efficiency of the linear motor is reduced. Additionally, a metal core adds mass to the linear motor which, as discussed above, requires a greater force to achieve a specified or peak acceleration. What is desired is a motor with less mass, a reduction in eddy currents, and a reduction in "cogging". Accordingly, a coreless motor having a single magnet track, as shown in FIGS. 1–5, substantially overcomes these problems.

Figure 6:
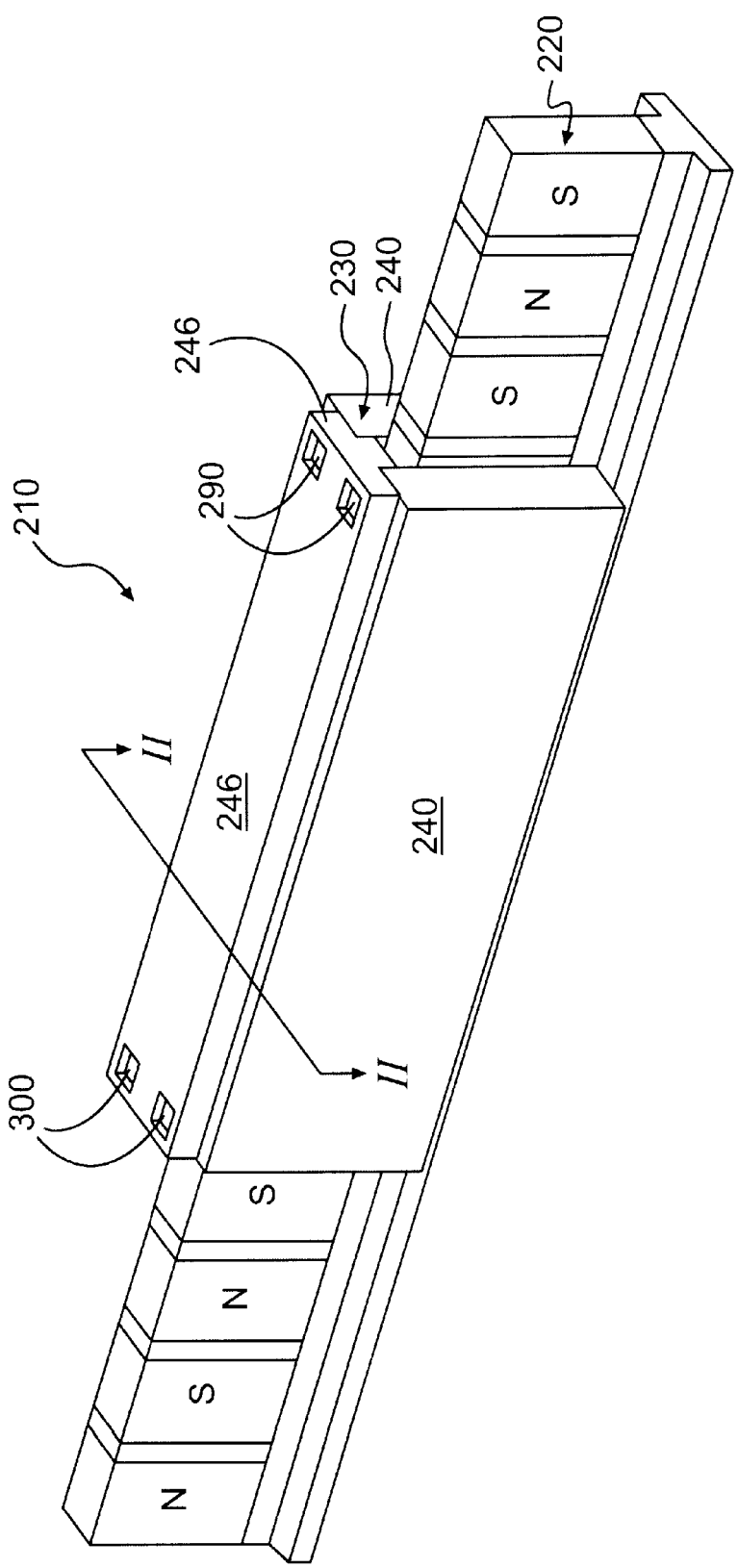
FIG. 6 is a perspective view of another embodiment of an electric linear motor in accordance with the present invention.

FIG. 6 shows another embodiment of the present invention. In FIG. 6, an electric linear motor 210 is shown having a magnet assembly 220 and a coil assembly 230. The coil assembly 230 comprises a plurality of bent and flat coils (not shown) identical to that described in the previous embodiments. The coil assembly 230 also has two cooling canisters 240 which, when a coolant flows through the canisters, prevent the environment external to the linear motor from increasing in temperature by more than a predetermined temperature rise. The coolant is driven through the cooling canisters 240 via fluid ingress ports 290 and fluid egress ports 300.

Figure 7:
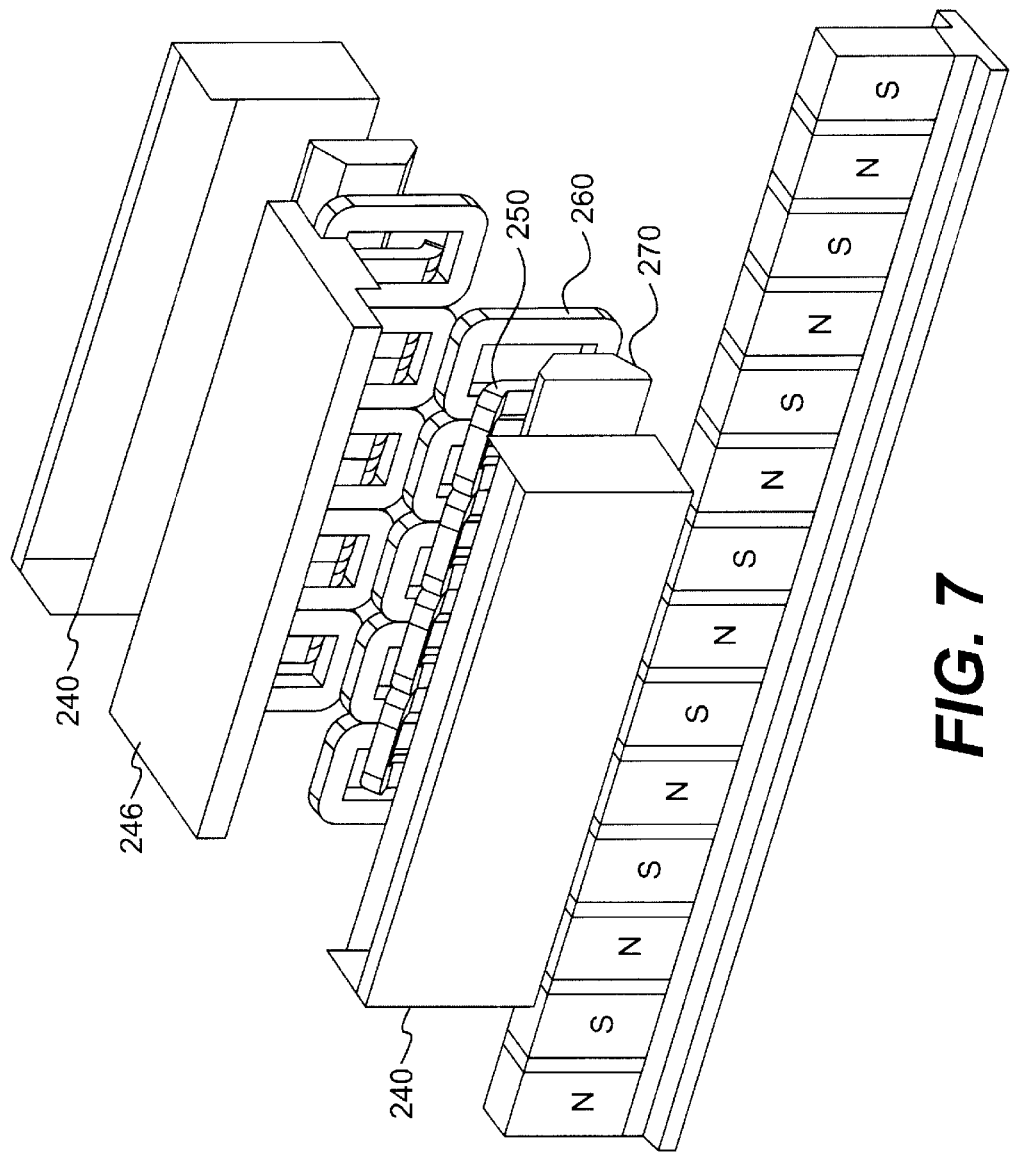
FIG. 7 is an exploded view of the embodiment shown in FIG. 6.

Referring to FIG. 7, the cooling canister 240 may contain a spacer block 270. The spacer block 270 is located inside the cooling canister 240. The spacer block 270 is about 15 to 30 mm thick and in some applications may be nonmagnetic and non-electrically conductive material such as ceramic or plastic. A metal material, either magnetic or nonmagnetic, may also be employed but nonmagnetic non-electrically conducting material is preferred to prevent "cogging", inducing eddy currents, and to reduce mass. The spacer block 270 may be attached to the outer wall of the canister using adhesives or fasteners, for example.

Figure 8:
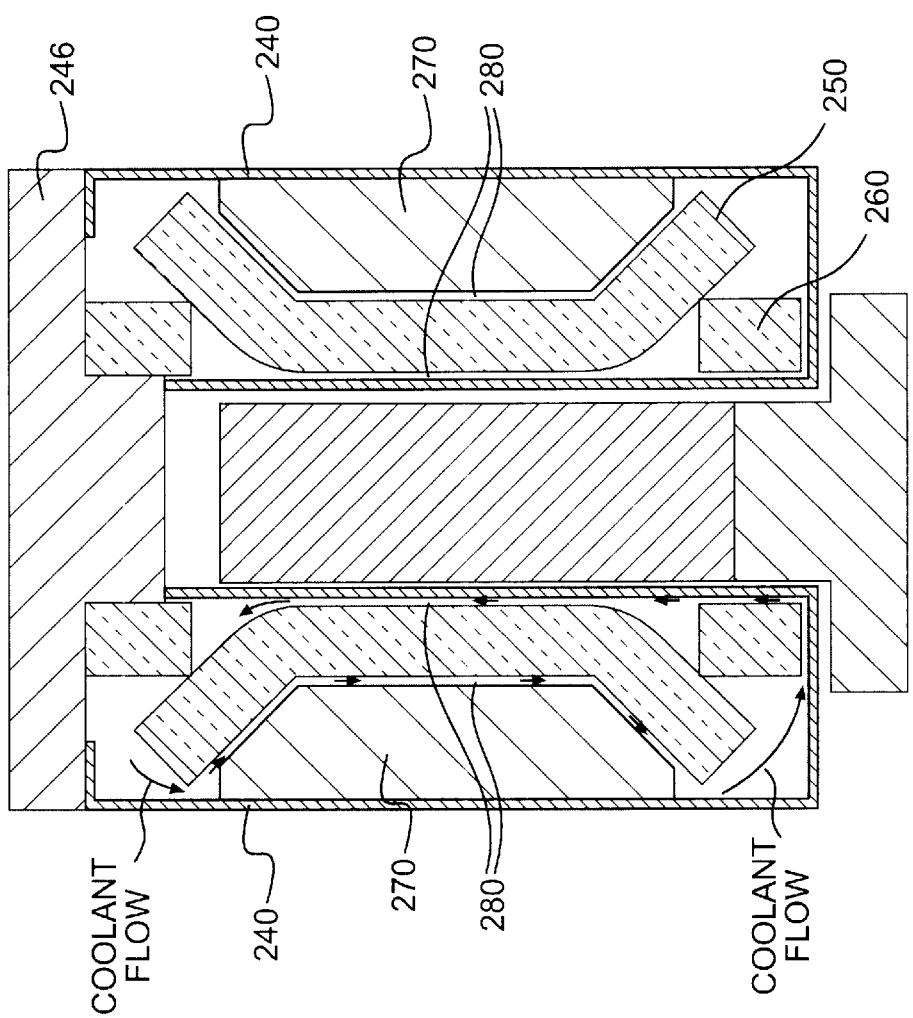
FIG. 8 is a sectional view taken along section line II—II of FIG. 6.

As shown in FIG. 8, the spacer block 270 forms a coolant gap 280 with the coil array. The coolant gap 280 ranges from about 0.1 to 10 mm and provides a pathway for the coolant to flow. The coolant flows through the coolant gaps 280 and absorbs heat generated by the coils. The coolant is capable of absorbing a substantial amount heat. Suitable coolants include various fluids such as, for example, air or water. A preferable coolant is Fluorinert FC77, manufactured by 3M in Minneapolis, Minn. which can absorb about 30 watts per liter per minute before rising 1° C.

Figure 9:
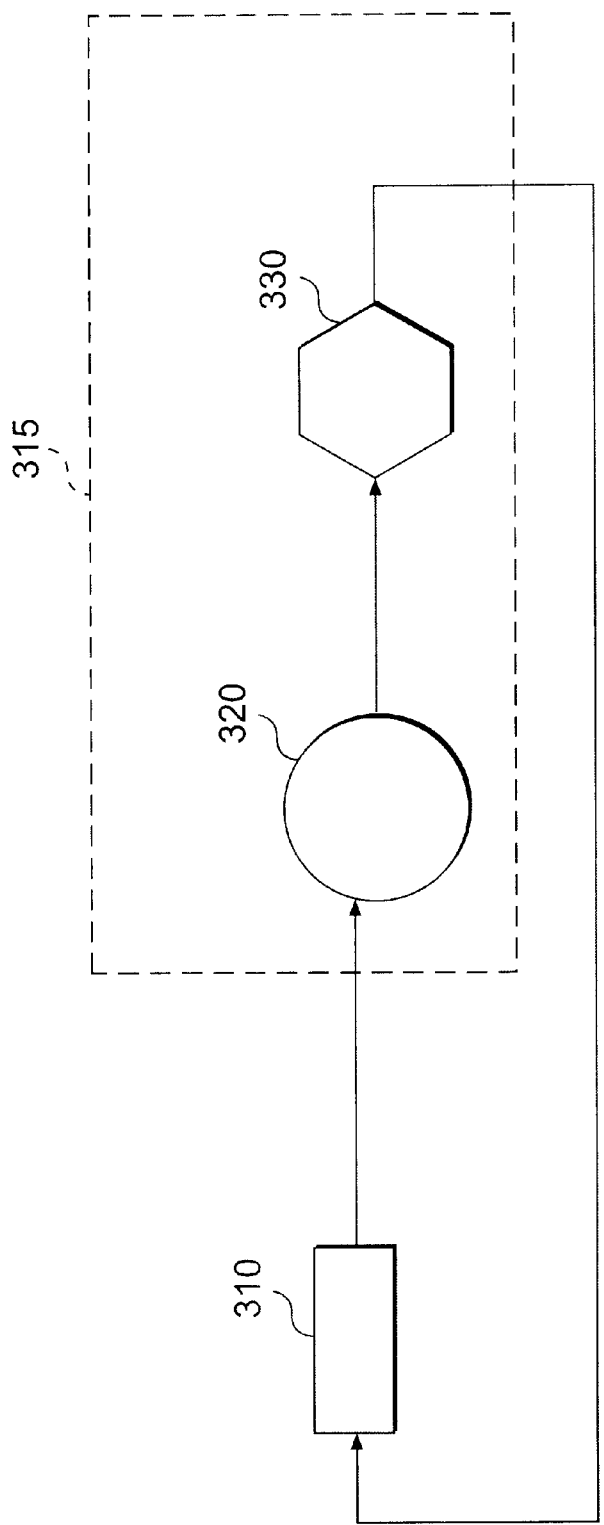
FIG. 9 is a block diagram of a motor and a chilling unit in fluid communication.

Referring to FIG. 9, coolant is pumped from a chilling unit 315 to a motor 310. The chilling unit 315 itself may contain a pump 320 and a chilling element 330, or the pump may be separate. Typically, an operator sets the chilling unit at an initial temperature and the chiller controls the fluid temperature to match the preset initial temperature. A preferable initial temperature is from about 20 to 25° C. and a preferred thermo-chiller is Model 2010 manufactured by Noah Precision, San Jose, Calif.

The flowrate is typically fixed. However, where the flowrate is not fixed by the chilling unit, it may be chosen based on the heat load of the system. The first step is to determine the amount of heat generated by the motor. The heat generated or power dissipated by the motor is calculated based on two parameters including: (1) the current required to achieve a specified acceleration, and (2) the coils' resistance to current flow. Next, the coolant's heat-absorption capacity is compared to the calculated value of the heat generated by the motor and the flowrate is set such that all heat is absorbed before the temperature of the coolant can increase above a specified or predetermined temperature rise.

Alternatively, the flowrate may be determined based on empirical information. One method to determine the flowrate based on empirical information is to measure the coolant temperature using, for example, a thermocouple. The thermocouple contacts the coolant and may be positioned inside or outside the canisters. The measured coolant temperature is compared to the initial temperature and if the difference is greater than a predetermined temperature rise, the flowrate is increased until the change in temperature is within the predetermined temperature rise. This feedback may be open or closed; that is, the flowrate can simply be preset or a closed-loop computer-controlled feedback loop, as apparent to those skilled in the art, may be employed which automatically adjusts the flowrate to maintain the temperature.

Thus, for a coolant capable of absorbing 30 watts per liter per minute before rising 1° C., the flowrate is set high enough to ensure all heat generated (i.e., power dissipated) by the electric motor is absorbed. Typical flowrates are from about 0.5 to 10 liters per minute and commonly about 2 liters per minute. The calculations can also, of course, be verified by placing a thermocouple in the coolant flowing out of the motor.

According to the present invention, therefore, not only are the coils themselves cooled, but also the temperature of the linear motor's external environment is maintained since substantially all heat generated by the coils is absorbed into the coolant. This is useful, for example, in preventing heat induced air turbulence, which may affect the accuracy of positioning sensors, such as a laser interferometer.

Figure 10:
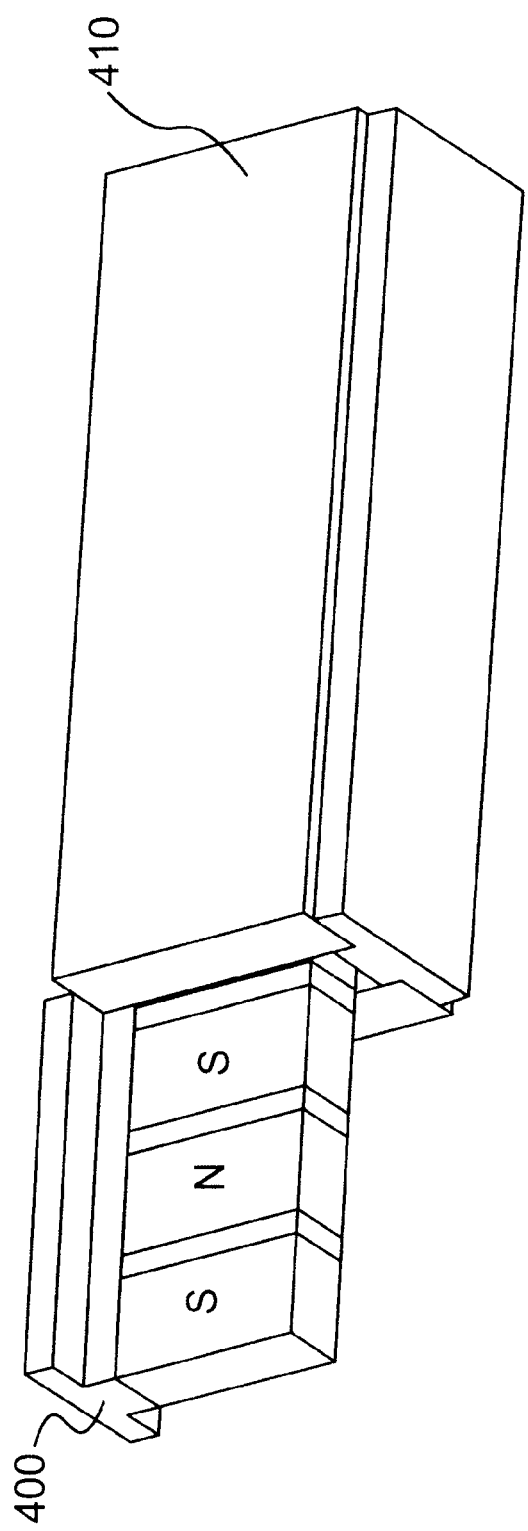
FIG. 10 is a perspective view of yet another embodiment of an electric motor in accordance with the present invention.

FIG. 10 shows yet another embodiment of the present invention. In FIG. 10, a magnet assembly 400 is slideably disposed within an armature 410. The armature 410 may be fixed to a supporting surface (not shown) which is stationary relative to a movable magnet assembly 400. The armature 410 has a length which is substantially greater than the length of the magnet assembly 400. The length of the armature 410 is equal to or greater than the length of the magnet assembly 400 plus the desired travel distance of the magnet assembly relative to the armature. Except for the length of the armature 410, the armature is substantially similar to the coil assembly described in the previous embodiments. Each side of the armature 410 comprises a number of bent coils interlocked with flat coils (not shown). Each side of armature 410 has a cooling canister which encloses the coils and prevents the temperature of the external environment from increasing by more than a predetermined temperature rise. The cooling canisters also operate as described in the previous embodiments.

Figure 11:
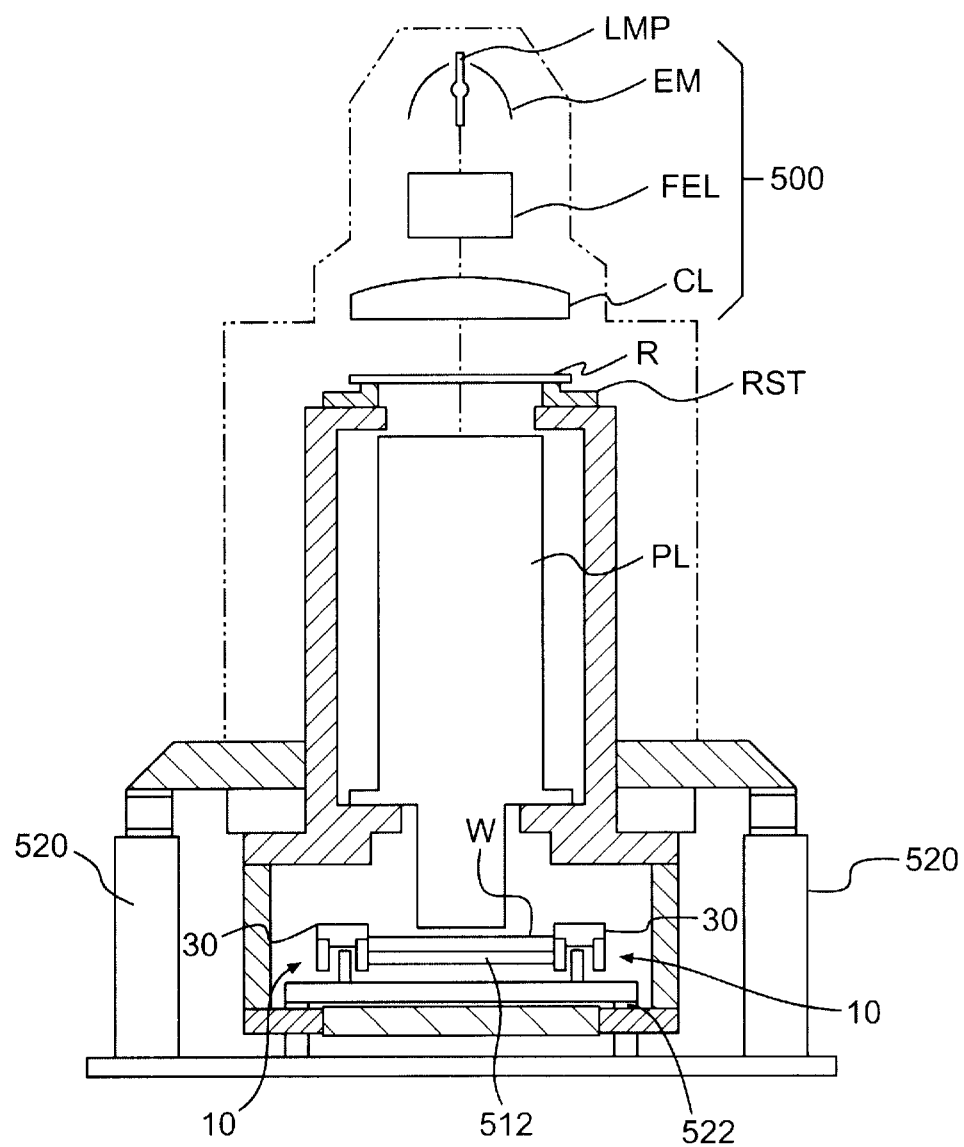
FIG. 11 is a schematic representation of a lithography system using an electric motor of the present invention.

FIG. 11 shows an application of an electric linear motor in accordance with the present invention. FIG. 11 schematically illustrates an example of a lithography system 500 using the motor 10 of the present invention. The lithography system 500 generally comprises an illumination system and the motor 10, and the stage 512 for wafer W support and positioning. The illumination system projects light through a mask pattern (e.g., a circuit pattern for a semiconductor device) on a reticle. The light exposes the mask pattern on a layer of photoresist on the wafer W. The optical system (irradiating system) includes an illuminator having a lamp LMP and an ellipsoid mirror EM surrounding the lamp. The illuminator comprises an optical integrator FEL producing secondary light source images and a condenser lens CL for illuminating the mask R with uniform light flux. A mask holder RST for holding the mask R is mounted above a lens barrel PL on a part of a column assembly which is supported on a plurality of rigid arms 520. The wafer W is shown supported on a support plate (upper surface of the stage 512).

At least one coil assembly 30 of motor 10 may be attached to the stage 512. Each coil assembly is slideably disposed around at least a portion of each magnet assembly 20. When individual coils or windings of the coil assembly 30 are selectively energized with current, the wafer stage attached to the coil assembly can be moved. It is to be understood that the lithography system may be different than the one shown herein without departing from the scope of the invention.

The light source for the photolithography system can be g-line (436 nm), i-line (365 nm), KrF excimer laser (248 nm), ArF excimer laser (193 nm) and $F_2$ laser (157 nm). Alternately, the light source can also use charged particle beams such as x-ray and electron beams. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

There are a number of different types of lithographic devices. For example, the lithography system 500 can be used in a scanning type photolithography system which exposes a mask pattern from the mask R onto the wafer W with the mask R and wafer W moving synchronously. In a scanning type lithographic device, the mask R is moved perpendicular to an optical axis of the lens barrel PL by the mask holder RST and the wafer W is moved perpendicular to an optical axis of the lens barrel PL by the stage 512. Scanning of the mask R and the wafer W occurs while the mask R and the wafer W are moving synchronously.

Alternately, the lithography system 500 can be a step-and-repeat type photolithography system that exposes the mask R while the mask R and the wafer W are stationary. In the step and repeat process, the wafer W is in a constant position relative to the mask R and the lens barrel PL during the exposure of an individual field. Subsequently, between consecutive exposure steps, the wafer W is consecutively moved by the stage 512 perpendicular to the optical axis of the lens barrel PL so that the next field of the wafer W is brought into position relative to the lens barrel PL and the mask R for exposure. Following this process, the images on the mask R are sequentially exposed onto the fields of the wafer W so that the next field of the wafer W is brought into position relative to the lens barrel PL and the mask R.

However, the use of the lithography system 500 provided herein is not limited to a photolithography system for semiconductor manufacturing. The lithography system 500, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a projection system. Additionally, the present invention provided herein can be used in other devices, including other semiconductor processing equipment, elevators, electric razors, machine tools, metal cutting machines, inspection machines and disk drives.

Figure 12:
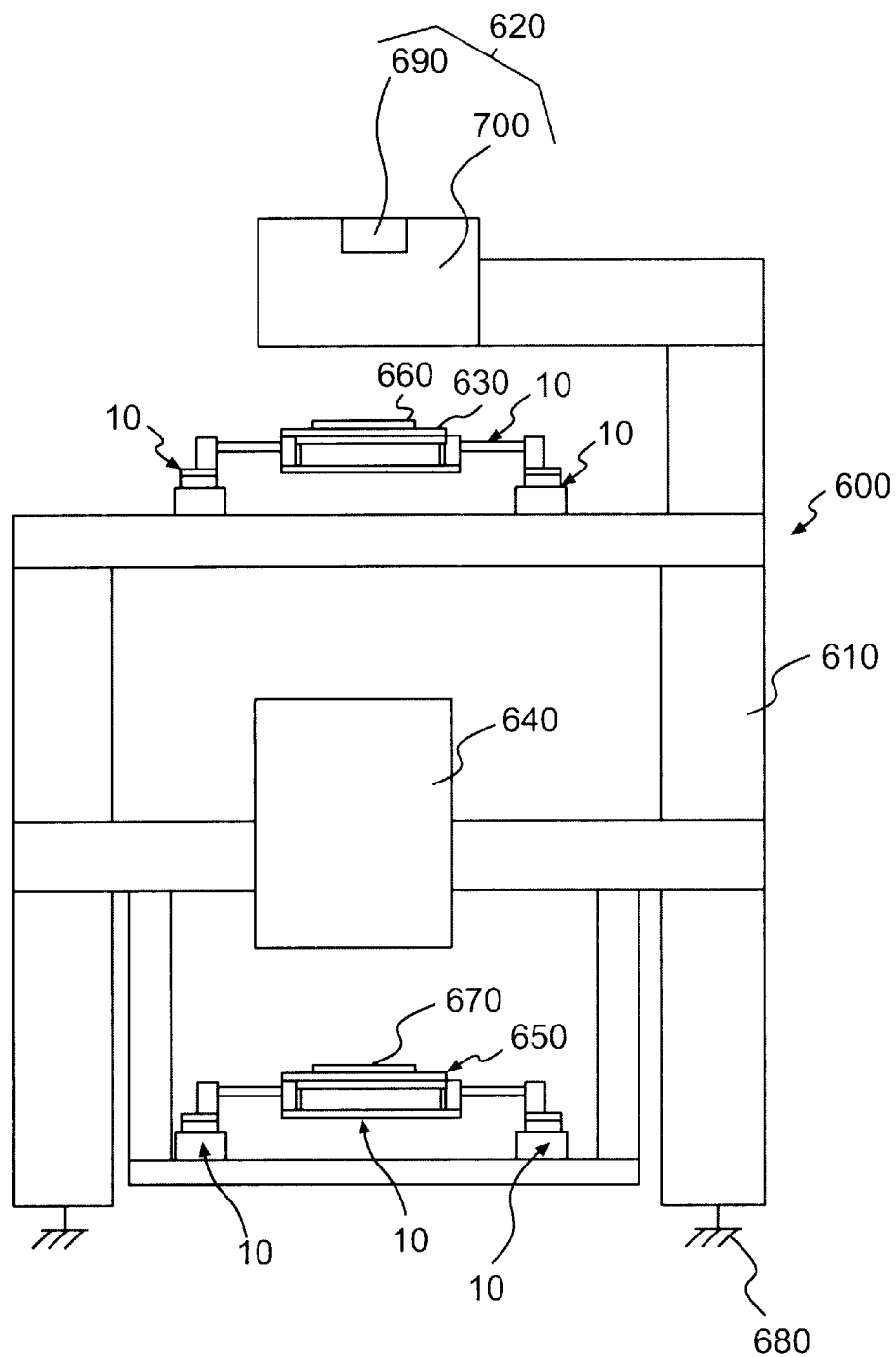
FIG. 12 is a side illustration of an exposure apparatus utilizing a linear motor having features of the present invention.

FIG. 12 is a schematic view illustrating an exposure apparatus 600 useful with the present invention. The exposure apparatus 600 includes an apparatus frame 610, an illumination system 620 (irradiation apparatus), a reticle stage 630, a lens assembly 640, and the wafer stage 650. One or more of the motors 10 provided herein can be used to move and position one or both of the stages 630, 650.

The exposure apparatus 600 is particularly useful as a lithographic device that transfers a pattern (not shown) of an integrated circuit from a first object, e.g. a reticle 660 onto a second object, e.g. the semiconductor wafer 670. The exposure apparatus 600 mounts to a base 680, i.e., a floor or the ground or some other supporting structure.

The apparatus frame 610 is rigid and supports the components of the exposure apparatus 600. The design of the apparatus frame 610 can be varied to suit the design requirements for the rest of the exposure apparatus 600. The apparatus frame 610 illustrated in FIG. 12 supports the reticle stage 630, the wafer stage 650, the lens assembly 640, and the illumination system 620 above the base 680. Alternately, for example, separate, individual structures (not shown) can be used to support the stages 630, 650, the illumination system 620 and the lens assembly 640 above the base 680.

The illumination system 620 includes an illumination source 690 and an illumination optical assembly 700. The illumination source 690 emits the beam (irradiation) of light energy. The illumination optical assembly 700 guides the beam of light energy from the illumination source 690 to the lens assembly 640. The beam illuminates selectively different portions of the reticle 660 and exposes the wafer 670. In FIG. 12, the illumination source 690 is illustrated as being supported above the reticle stage 630. Typically, however, the illumination source 690 is secured to one of the sides of the apparatus frame 610 and the energy beam from the illumination source 690 is directed to above the reticle stage 630 with the Illumination optical assembly 700.

The lens assembly 640 projects and/or focuses the light passing through reticle 660 to the wafer 670. Depending upon the design of the apparatus 600, the lens assembly 640 can magnify or reduce the image illuminated on the reticle 660.

The reticle stage 630 holds and precisely positions the reticle 660 relative to the lens assembly 640 and the wafer 670. Somewhat similarly, the wafer stage 650 holds and positions the wafer 670 with respect to the projected image of the illuminated portions of the reticle 660. In the embodiment illustrated in FIG. 13, the wafer stage 650 and the reticle stage 630 are positioned by shaft-type motors 10 having features of the present invention. Depending upon the design, the apparatus 600 can also include additional servo drive units, linear motors and planar motors to move the stages 650, 630.

There are a number of different types of lithographic devices. For example, the exposure apparatus 600 can be used a scanning type photolithography system which exposes the pattern from the reticle 660 onto the wafer 670 with the reticle 660 and wafer 670 moving synchronously. In a scanning type lithographic device, the reticle 660 is moved perpendicular to an optical axis of the lens assembly 640 by the reticle stage 630 and the wafer 670 is moved perpendicular to an optical axis of the lens assembly 640 by the wafer stage 650. Scanning of the reticle 660 and the wafer 670 occurs while the reticle 660 and the wafer 670 are moving synchronously.

Alternately, the exposure apparatus 600 can be a step-and-repeat type photolithography system that exposes the reticle 660 while the reticle 660 and the wafer 670 are stationary. In the step and repeat process, the wafer 670 is in a constant position relative to the reticle 660 and the lens assembly 640 during the exposure of an individual field. Subsequently, between consecutive exposure steps, the wafer 670 is consecutively moved by the wafer stage 650 perpendicular to the optical axis of the lens assembly 640 so that the next field of the semiconductor wafer 670 is brought into position relative to the lens assembly 640 and the reticle 660 for exposure. Following this process, the images on the reticle 660 are sequentially exposed onto the fields of the wafer 670 so that the next field of the semiconductive wafer 670 is brought into position relative to the lens assembly 640 and the reticle 660.

However, the use of the exposure apparatus 600 provided herein is not limited to a photolithography system for semiconductor manufacturing. The exposure apparatus 600, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a lens assembly. Additionally, the present invention provided herein can be used in other devices, including other semiconductor processing equipment, elevators, electric razors, machine tools, metal cutting machines, inspection machines and disk drives.

The illumination source 690 can be g-line (436 nm), i-line (365 nm), KrF excimer laser (248 nm), ArF excimer laser (193 nm) and $F_2$ laser (157 nm). Alternately, the illumination source 690 can also use charged particle beams such as x-ray and electron beams. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

In terms of the magnification of the lens assembly 640 included in the photolithography system, the lens assembly 640 need not be limited to a reduction system. It could also be a I x or magnification system.

With respect to a lens assembly 640, when far ultra-violet rays such as the excimer laser is used, glass materials such as quartz and fluorite that transmit far ultra-violet rays is preferable to be used. When the $F_2$ type laser or x-ray is used, the lens assembly 640 should preferably be either catadioptric or refractive (a reticle should also preferably be a reflective type), and when an electron beam is used, electron optics should preferably consist of electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No. 8-171054 published in the Official Gazette for Laid-Open Patent Applications and its counterpart U.S. Pat. No. 5,668,672, as well as Japan Patent Application Disclosure No. 10-20195 and its counterpart U.S. Pat. No. 5,835,275. In these cases, the reflecting optical device can be a catadioptric optical system incorporating a beam splitter and concave mirror. Japan Patent Application Disclosure No. 8-334695 published in the Official Gazette for Laid-Open Patent Applications and its counterpart U.S. Pat. No. 5,689,377 as well as Japan Patent Application Disclosure No. 10-3039 and its counterpart U.S. patent application Ser. No. 873,605 (Application Date: Jun. 12, 1997) also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

Further, in photolithography systems, when linear motors (see U.S. Pat. Nos. 5,623,853 or 5,528,118) are used in a wafer stage or a mask stage, the linear motors can be either an air levitation type employing air bearings or a magnetic levitation type using Lorentz force or reactance force. Additionally, the stage could move along a guide, or it could be a guideless type stage which uses no guide. As far as is permitted, the disclosures in U.S. Pat. Nos. 5,623,853 and 5,528,118 are incorporated herein by reference.

Alternatively, one of the stages could be driven by a planar motor, which drives the stage by electromagnetic force generated by a magnet unit having two-dimensionally arranged magnets and an armature coil unit having two-dimensionally arranged coils in facing positions. With this type of driving system, either one of the magnet unit or the armature coil unit is connected to the stage and the other unit is mounted on the moving plane side of the stage.

Movement of the stages as described above generates reaction forces which can affect performance of the photolithography system. Reaction forces generated by the wafer (substrate) stage motion can be mechanically released to the floor (ground) by use of a frame member as described in U.S. Pat. No. 5,528,118 and published Japanese Patent Application Disclosure No. 8-166475. Additionally, reaction forces generated by the reticle (mask) stage motion can be mechanically released to the floor (ground) by use of a frame member as described in U.S. Pat. No. 5,874,820 and published Japanese Patent Application Disclosure No. 8-330224. As far as is permitted, the disclosures in U.S. Pat. Nos. 5,528,118 and 5,874,820 and Japanese Patent Application Disclosure No. 8-330224 are incorporated herein by reference.

As described above, a photolithography system according to the above described embodiments can be built by assembling various subsystems, including each element listed in the appended claims, in such a manner that prescribed mechanical accuracy, electrical accuracy and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, total adjustment is performed to make sure that every accuracy is maintained in the complete photolithography system. Additionally, it is desirable to manufacture an exposure system in a clean room where the temperature and cleanliness are controlled.

Figure 13:
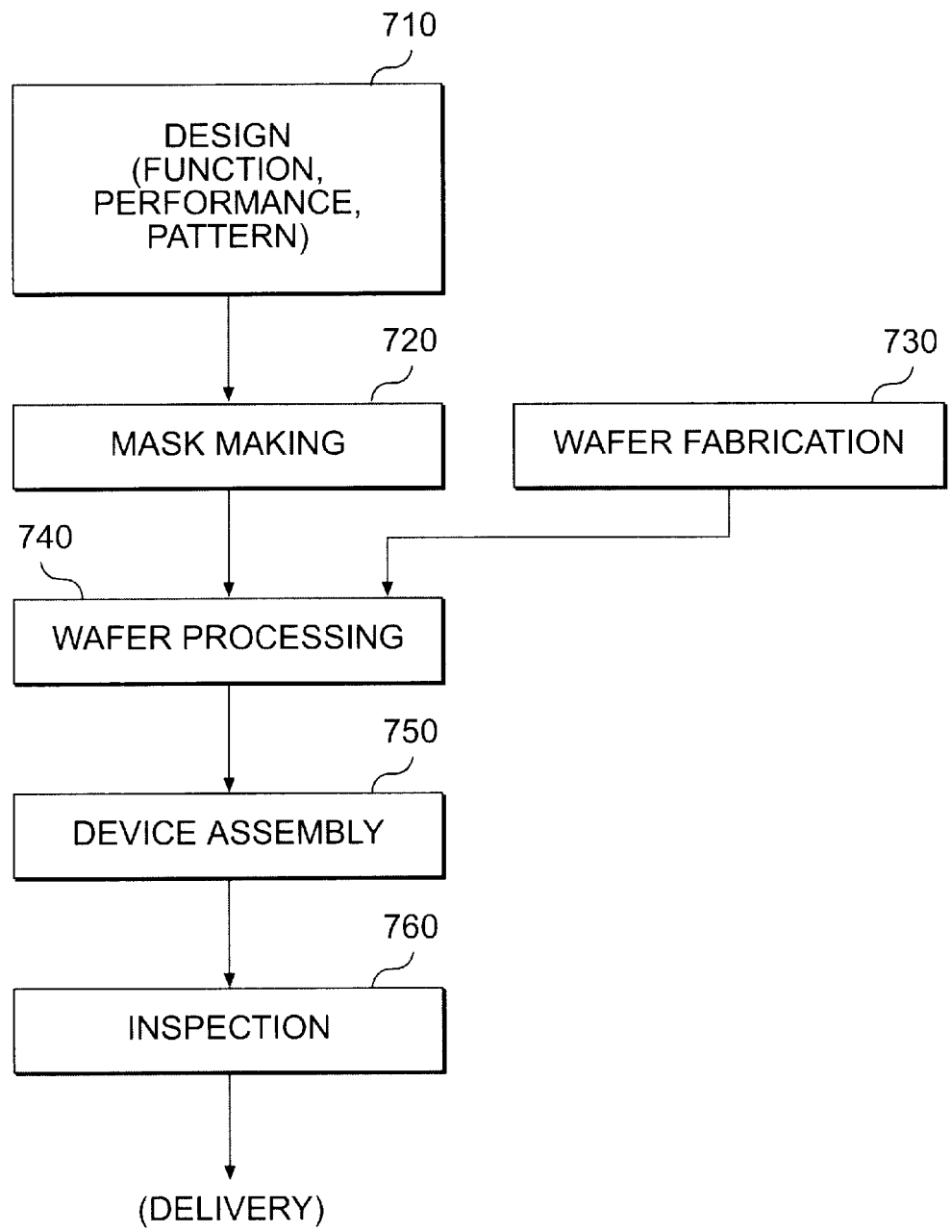
FIG. 13 is a flow chart that outlines a process for manufacturing a device in accordance with the present invention.

Further, semiconductor devices can be fabricated using the above described systems, by the process shown generally in FIG. 13. In step 710 the device's function and performance characteristics are designed. Next, in step 720, a mask (reticle) having a pattern is designed according to the previous designing step, and in a parallel step 730 a wafer is made from a silicon material. The mask pattern designed in step 720 is exposed onto the wafer from step 730 in stop 740 by a photolithography system described hereinabove in accordance with the present invention. In step 750 the semiconductor device is assembled (including the dicing process, bonding process and packaging process), then finally the device is inspected in step 760.

Figure 14:
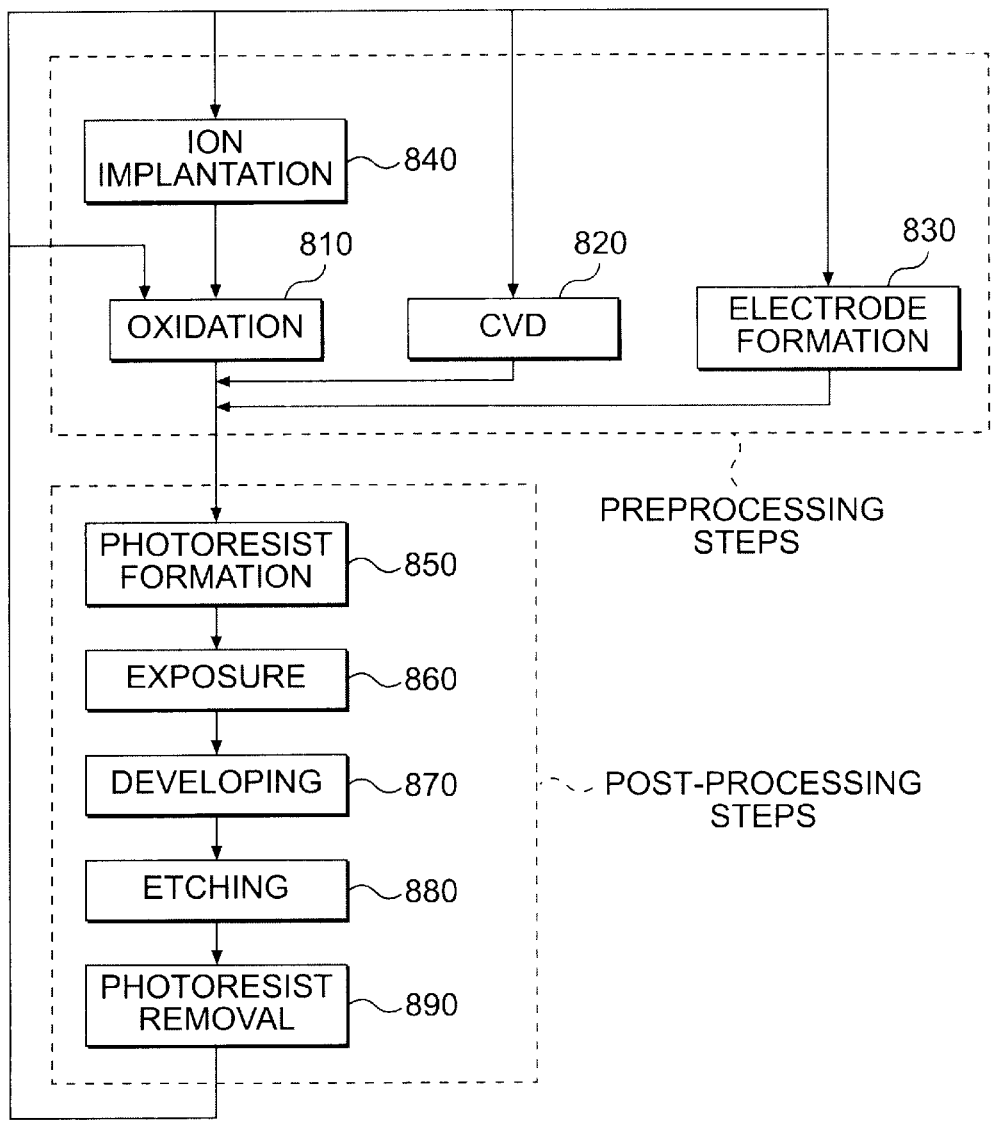
FIG. 14 is a flow chart that outlines device processing in more detail.

FIG. 14 illustrates a detailed flowchart example of the above-mentioned step 740 in the case of fabricating semiconductor devices. In FIG. 14, in step 810 (oxidation step), the wafer surface is oxidized. In step 820 (CVD step), an insulation film is formed on the wafer surface. In step 830 (electrode formation step), electrodes are formed on the wafer by vapor deposition. In step 840 (ion implantation step), ions are implanted in the wafer. The above mentioned steps 810–840 form the preprocessing steps for wafers during wafer processing, and selection is made at each step according to processing requirements.

At each stage of wafer processing, when the above-mentioned preprocessing steps have been completed, the following post-processing steps are implemented. During post-processing, firstly, in step 850 (photoresist formation step), photoresist is applied to a wafer. Next, in step 860, (exposure step), the above-mentioned exposure device is used to transfer the circuit pattern of a mask (reticle) to a wafer. Then, in step 870 (developing step), the exposed wafer is developed, and in step 880 (etching step), parts other than residual photoresist (exposed material surface) are removed by etching. In step 890 (photoresist removal step), unnecessary photoresist remaining after etching is removed.

Multiple circuit patterns are formed by repetition of these preprocessing and post-processing steps.

Importantly, with the present invention, the magnet assemblies 20 provided herein have an improved flux/mass ratio. In some embodiments, the magnet assembly 20 has increased flux density for a given mass of magnet assembly 20. Alternately, in some embodiments, the magnet assembly 20 has a decreased magnet mass for a given flux density.

While the particular magnet arrays 20 and motor 10 as herein shown and disclosed in detail are fully capable of obtaining the objects and providing the advantages herein before stated, it is to be understood that they are merely illustrative of embodiments of the invention and that no limitations are intended to the details of construction or design herein shown other than as described in the appended claims.

As described above, the photolithography system of the present invention can be built by assembling various subsystems, in the manner that prescribed mechanical accuracy, electrical accuracy and optical accuracy are maintained. Examples of the subsystems are the illumination system, optical system (irradiation system), reticle stage, and wafer stage.

In order to maintain accuracy of various subsystems, every subsystem is adjusted to achieve its optical accuracy, mechanical accuracy, and electrical accuracy before and after its assembly. The process of assembling each subsystem into a photolithography system includes mechanical interface, electrical wiring connections, and air pressure plumbing connections. Once the photolithography system is assembled with various subsystems, total adjustment is performed so as to ensure that every accuracy is maintained in a complete system. It is desirable to manufacture the photolithography system in a clean room where the temperature and cleanliness are controlled, as is well known by those skilled in the art.

When the present invention is applied to manufacturing a semiconductor device, such device is fabricated by going through the following steps, for example: design of the device's function and performance; reticle design; manufacturing of the wafer from a silicon material; exposure of a reticle pattern on a wafer by the photolithography system; assembly of the device (including a dicing process, bonding process and packaging process); and inspection and testing of the semiconductor device.

In view of the above, it will be seen that the several features of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

What is claimed is:

1. An electric linear motor comprising:
    a magnet assembly comprising a plurality of magnets fixed to a base member, each magnet comprising two opposing magnetic surfaces having opposite magnetic poles, said plurality of magnets being attached to said base member such that said opposing magnetic surfaces are aligned and alternate in magnetic polarity along said base member; and
    a coil assembly disposed around at least a portion of said magnet assembly, said coil assembly comprising two walls joined to a header, each of said two walls comprising a plurality of juxtaposed flat coils, each of said two walls further comprising a plurality of bent coils overlapping with said flat coils such that two adjacent vertical sides of adjacent bent coils are positioned within an aperture of a corresponding flat coil,
    wherein the coil assembly further comprises a pair of cooling canisters, each of said cooling canisters being attached to said header and enclosing one of said walls, each of said cooling canisters having at least one fluid ingress port and at least one fluid egress port to allow a cooling fluid to flow through said canister thereby removing heat from the electric linear motor.

2. The electric linear motor as recited in claim 1, wherein said magnet assembly is mounted to a relatively fixed supporting surface and said coil assembly is adapted to travel along said magnet assembly.

3. The electric linear motor as recited in claim 1, wherein said coil assembly is mounted to a relatively fixed supporting surface and said magnet assembly is adapted to travel along said coil assembly.

4. The electric linear motor as recited in claim 2, wherein the magnet assembly has a length equal to or greater than the length of the coil assembly plus a desired travel distance of the coil assembly relative to the magnet assembly.

5. The electric linear motor as recited in claim 3, wherein the coil assembly has a length equal to or greater than the length of the magnet assembly plus a desired travel distance of the magnet assembly relative to the coil assembly.

6. The electric linear motor as recited in claim 1, wherein each of said canisters further encloses a spacer block, said spacer block configured such that when said spacer block is positioned in said canister, said spacer block and said wall form a coolant gap therebetween.

7. The electric linear motor as recited in claim 6, wherein said spacer block is made from a substantially non-electrically conductive material.

8. The electric motor as recited in claim 1, wherein the fluid can absorb at least 30 watts before rising about 1° C.

9. The electric motor as recited in claim 1, further comprising a thermocouple positioned to be in contact with the fluid such that a fluid temperature can be measured.

10. The electric motor as recited in claim 9, wherein said thermocouple comprises at least one thermocouple positioned inside at least one of said canisters.

11. The electric linear motor as recited in claim 1, wherein said bent coils of one of said walls bend to the same direction.

12. An exposure apparatus comprising:
    a source of a beam, said beam projecting light through a reticle;
    an optical system into which said beam is directed for focusing said beam onto a substrate;
    a stage holding said substrate, said beam passing through said reticle onto said substrate; and
    an electric motor which drives said stage in a direction perpendicular to an axis of said beam, said electric motor including a coil assembly disposed around at least a portion of a magnet assembly, said coil assembly comprising two walls joined to a header, each of said two walls comprising a plurality of juxtaposed flat coils, each of said two walls further comprising a plurality of bent coil overlapping with said flat coils such that two adjacent vertical sides of adjacent bent coils are positioned within an aperture of a corresponding flat coil, wherein the coil assembly further comprises a pair of cooling canisters, each of said cooling canisters being attached to said header and enclosing one of said walls, each of said cooling canisters having at least one fluid ingress port and at least one fluid egress port to allow a cooling fluid to flow through said canister thereby removing heat from the electric linear motor.

13. The exposure apparatus as recited in claim 12, wherein each of said canisters further encloses a spacer block, said spacer block configured such that when said spacer block is positioned in said canister, said spacer block and said wall form a coolant gap therebetween.

14. The exposure apparatus as recited in claim 13, wherein said spacer block is made from a substantially non-electrically conductive material.

15. The exposure apparatus as recited in claim 12, wherein the fluid can absorb at least 30 watts before rising 1° C.

16. The exposure apparatus as recited in claim 12, further comprising a thermocouple positioned to be in contact with the fluid such that a fluid temperature can be measured.

17. The exposure apparatus as recited in claim 16, wherein said thermocouple comprises at least one thermocouple positioned inside at least one of said canisters.

18. An object on which an image has been formed by the exposure apparatus of claim 17.

19. The exposure apparatus as recited in claim 12, wherein said bent coils of one of said walls of said electric motor bend to the same direction.

20. An armature for use in an electric motor, said armature comprising:

a coil assembly comprising two walls joined to a header, each of said two walls comprising a plurality of juxtaposed flat coils, each of said two walls further comprising a plurality of bent coils overlapping with said flat coils such that two adjacent vertical sides of adjacent bent coils are positioned within an aperture of a corresponding flat coil, wherein the coil assembly further comprises a pair of cooling canisters, each of said cooling canisters being attached to said header and enclosing one of said walls, each of said cooling canisters having at least one fluid ingress port and at least one fluid egress port to allow a cooling fluid to flow through said canister thereby removing heat from the electric linear motor.

21. The armature as recited in claim 20, wherein each of said canisters further encloses a spacer block, said spacer block configured such that when said spacer block is positioned in said canister, said spacer block and said wall form a coolant gap therebetween.

22. The armature as recited in claim 21, wherein said spacer block is made from a substantially non-electrically conductive material.

23. The armature as recited in claim 20, wherein the fluid can absorb at least 30 watts before rising about 1° C.

24. The armature as recited in claim 20, further comprising a thermocouple positioned to be in contact with the fluid such that a fluid temperature can be measured.

25. The armature as recited in claim 24, wherein said thermocouple comprises at least one thermocouple positioned inside at least one of said canisters.

26. The armature as recited in claim 20, wherein said bent coils of one of said walls bend to the same direction.

27. A coreless electric linear motor for causing smooth and unbiased linear motion comprising:

a magnet assembly comprising a plurality of magnets fixed to a base member, each magnet comprising two opposing magnetic surfaces having opposite magnetic poles, said plurality of magnets being attached to said base member such that said opposing magnetic surfaces are aligned and alternate in magnetic polarity along said base member; and a coreless coil assembly slideably disposed over at least a portion of the magnet assembly, said coil assembly having two substantially parallel arrays of juxtaposed flat coils and bent coils, said bent coils overlapping with said flat coils such that two adjacent vertical sides of adjacent bent coils are positioned within an aperture of a corresponding flat coil, wherein each of said bent coils has two outward bends relative to said magnets, and wherein each of said arrays is enclosed by a cooling canister, said canister being cooled by a heat-absorbing fluid pumped through said canister so as to prevent an increase in a canister temperature by more than a predetermined temperature rise.

28. The coreless electric linear motor as recited in claim 27, wherein said predetermined temperature rise is about 1° C.

29. The coreless electric linear motor as recited in claim 28 further comprising a thermocouple positioned to be in contact with the fluid such that a fluid temperature can be measured.

30. The coreless electric linear motor as recited in claim 29, wherein said thermocouple comprises at least one thermocouple positioned inside at least one of said canisters.

31. The coreless electric linear motor as recited in claim 27, wherein said bent coils of one of said parallel arrays bend to the same direction.

32. A method for making a linear motor using an electromagnetic force, comprising the steps of:

manufacturing a coil assembly by forming a number of individual coils, insulating the coils, pressing coils to be shaped, interlocking the shaped coils with non-pressed coils such that two adjacent vertical sides of adjacent shaped coils are positioned within an aperture of a corresponding non-pressed coil, attaching the interlocked coils to a header, electrically connecting the interlocked coils to a terminal, and enclosing the interlocked coils in a pair of cooling canisters, each of said cooling canisters being attached to said header and having at least one fluid ingress port and at least one fluid egress port to allow a cooling fluid to flow through said canister thereby removing heat from the interlocked coils; and disposing the coil assembly moveably relative to a magnet assembly by said electromagnetic force.

33. A method for making an exposure apparatus that forms an image formed on a first object on a second object, comprising the steps of:

providing an irradiation apparatus that irradiates the first object supported by a first stage with radiation to form the image on the second object;

manufacturing a coil assembly by forming a number of individual coils, insulating the coils, pressing coils to be shaped, interlocking the shaped coils with non-pressed coils such that two adjacent vertical sides of adjacent shaped coils are positioned within an aperture of a corresponding non-pressed coil, attaching the interlocked coils to a header, electrically connecting the interlocked coils to a terminal, and enclosing the interlocked coils in a pair of cooling canisters, each of said cooling canisters being attached to said header and having at least one fluid ingress port and at least one fluid egress port to allow a cooling fluid to flow through said canister thereby removing heat from the interlocked coils;

disposing the coil assembly moveably relative to a magnet assembly by an electromagnetic force and thereby forming a linear motor; and connecting the linear motor to the first stage as a driving force that moves the first object.

34. A method for making a device, comprising the steps of:

providing an irradiation apparatus including a first stage that supports a first object, an image being formed on the first object;

manufacturing a coil assembly by forming a number of individual coils, insulating the coils, pressing coils to be shaped, interlocking the shaped coils with non-pressed coils such that two adjacent vertical sides of adjacent shaped coils are positioned within an aperture of a corresponding non-pressed coil, attaching the interlocked coils to a header, electrically connecting the interlocked coils to a terminal, and enclosing the interlocked coils in a pair of cooling canisters, each of said cooling canisters being attached to said header and having at least one fluid ingress port and at least one fluid egress port to allow a cooling fluid to flow through said canister thereby removing heat from the interlocked coils;

disposing the coil assembly moveably relative to a magnet assembly by an electromagnetic force and thereby forming a linear motor;

connecting the linear motor to the first stage as a driving force that moves the first object; and irradiating the first object with radiation to form the image on the device.

35. A method for making an exposure apparatus that forms an image on an object, comprising the steps of:

providing an irradiation apparatus that irradiates the object supported by a stage with radiation to form the image on the object;

manufacturing a coil assembly by forming a number of individual coils, insulating the coils, pressing coils to be shaped, interlocking the shaped coils with non-pressed coils such that two adjacent vertical sides of adjacent shaped coils are positioned within an aperture of a corresponding non-pressed coil, attaching the interlocked coils to a header, electrically connecting the interlocked coils to a terminal, and enclosing the interlocked coils in a pair of cooling canisters, each of said cooling canisters being attached to said header and having at least one fluid ingress port and at least one fluid egress port to allow a cooling fluid to flow through said canister thereby removing heat from the interlocked coils;

disposing the coil assembly moveably relative to a magnet assembly by an electromagnetic force and thereby forming a linear motor; and connecting the linear motor to the stage as a driving force that moves the object.

36. A method for making a device, comprising the steps of:

providing an irradiation apparatus including a stage that supports the device;

manufacturing a coil assembly by forming a number of individual coils, insulating the coils, pressing coils to be shaped, interlocking the shaped coils with non-pressed coils such that two adjacent vertical sides of adjacent shaped coils are positioned within an aperture of a corresponding non-pressed coil, attaching the interlocked coils to a header, electrically connecting the interlocked coils to a terminal, and enclosing the interlocked coils in a pair of cooling canisters, each of said cooling canisters being attached to said header and having at least one fluid ingress port and at least one fluid egress port to allow a cooling fluid to flow through said canister thereby removing heat from the interlocked coils;

disposing the coil assembly moveably relative to a magnet assembly by an electromagnetic force and thereby forming a linear motor;

connecting the linear motor to the stage as a driving force that moves the device; and irradiating the device with radiation to form an image on the device.

37. An electric linear motor comprising:

a magnet assembly comprising a plurality of magnets fixed to a base member, each magnet comprising two opposing magnetic surfaces having opposite magnetic poles, said plurality of magnets being attached to said base member such that said opposing magnetic surfaces are aligned and alternate in magnetic polarity along said base member; and a coil assembly disposed around at least a portion of said magnet assembly, said coil assembly comprising two walls joined to a header, each of said two walls comprising a plurality of juxtaposed flat coils, each of said two walls further comprising a plurality of bent coils overlapping with said flat coils such that a vertical side of each bent coil is positioned within an aperture of each flat coil, wherein the coil assembly further comprises a pair of cooling canisters, each of said cooling canisters being attached to said header and enclosing one of said walls, each of said cooling canisters having at least one fluid ingress port and at least one fluid egress port to allow a cooling fluid to flow through said canister thereby removing heat from the electric linear motor, and wherein each of said canisters further encloses a spacer block, said spacer block configured such that when said spacer block is positioned in said canister, said spacer block and said wall form a coolant gap therebetween.

38. An exposure apparatus comprising:

a source of a beam, said beam projecting light through a reticle;

an optical system into which said beam is directed for focusing said beam onto a substrate;

a stage holding said substrate, said beam passing through said reticle onto said substrate; and an electric motor which drives said stage in a direction perpendicular to an axis of said beam, said electric motor including a coil assembly disposed around at least a portion of a magnet assembly, said coil assembly comprising two walls joined to a header, each of said two walls comprising a plurality of juxtaposed flat coils, each of said two walls further comprising a plurality of bent coils overlapping with said flat coils such that a vertical side of each bent coil is positioned within an aperture of each flat coil, wherein the coil assembly further comprises a pair of cooling canisters, each of said cooling canisters being attached to said header and enclosing one of said walls, each of said cooling canisters having at least one fluid ingress port and at least one fluid egress port to allow a cooling fluid to flow through said canister thereby removing heat from the electric linear motor, and wherein each of said canisters further encloses a spacer block, said spacer block configured such that when said spacer block is positioned in said canister, said spacer block and said wall form a coolant gap therebetween.

39. An armature for use in an electric motor, said armature comprising:

a coil assembly comprising two walls joined to a header, each of said two walls comprising a plurality of juxtaposed flat coils, each of said two walls further comprising a plurality of bent coils overlapping with said flat coils such that a vertical side of each bent coil is positioned within an aperture of each flat coil, wherein the coil assembly further comprises a pair of cooling canisters, each of said cooling canisters being attached to said header and enclosing one of said walls, each of said cooling canisters having at least one fluid ingress port and at least one fluid egress port to allow a cooling fluid to flow through said canister thereby removing heat from the electric linear motor, and wherein each of said canisters further encloses a spacer block, said spacer block configured such that when said spacer block is positioned in said canister, said spacer block and said wall form a coolant gap therebetween.

* * * * *

UNITED STATES PATENT AND TRADEMARK OFFICE
CERTIFICATE OF CORRECTION

PATENT NO.    : 6,570,273 B2                                              Page 1 of 1
DATED         : May 27, 2003
INVENTOR(S)   : Andrew J. Hazelton It is certified that error appears in the above-identified patent and that said Letters Patent is hereby corrected as shown below:

<u>Column 15,</u>
Line 3, "bent coil" should read -- bent coils --.

Signed and Sealed this

Twenty-second Day of July, 2003

JAMES E. ROGAN
*Director of the United States Patent and Trademark Office*